United States Patent
Su et al.

(10) Patent No.: US 6,888,030 B2
(45) Date of Patent: May 3, 2005

(54) ADVANCES IN AMINATION

(75) Inventors: Wei-Yang Su, Austin, TX (US); Wheeler C. Crawford, Houston, TX (US); John M. Larkin, Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 156 days.

(21) Appl. No.: 10/277,551

(22) Filed: Oct. 22, 2002

(65) Prior Publication Data

US 2003/0078344 A1 Apr. 24, 2003

Related U.S. Application Data

(60) Provisional application No. 60/345,881, filed on Oct. 23, 2001.

(51) Int. Cl.$^7$ ............................................ C07C 209/34
(52) U.S. Cl. ..................... 564/494; 564/503; 568/944; 525/333.7; 525/338; 525/339; 525/374; 525/384
(58) Field of Search .................................. 564/494, 503; 568/944; 525/333.7, 338, 339, 374, 384

(56) References Cited

U.S. PATENT DOCUMENTS

| | | | | |
|---|---|---|---|---|
| 3,681,463 A | * | 8/1972 | Lee | 564/503 |
| 3,739,027 A | * | 6/1973 | Gates, Jr. | 564/494 |
| 5,879,420 A | * | 3/1999 | Kropp et al. | 44/412 |
| 6,069,281 A | * | 5/2000 | Kropp et al. | 564/494 |

* cited by examiner

*Primary Examiner*—Fred Teskin
(74) *Attorney, Agent, or Firm*—Russ R. Stolle; Ron D. Brown; Christopher J. Whewell

(57) ABSTRACT

Inclusion of a branched alcohol in the catalytic hydrogenation reaction involving an aliphatic nitro compound dramatically increases the efficiency of the conversion of nitro groups into amino groups. This discovery is of particular value in the production of polyalkyleneamines via nitration of a polyalkene, such as a polybutene, and its subsequent reduction. The polyalkyleneamines so produced are useful as dispersant additives for motor oils and fuels.

6 Claims, No Drawings

ADVANCES IN AMINATION

CROSS-REFERENCES TO RELATED APPLICATIONS

This Application claims the benefit of U.S. Provisional Application No. 60/345,881 filed Oct. 23, 2001, which is currently still pending.

TECHNICAL FIELD

The present invention relates to a process for producing amines. More particularly, it relates to the production of polyisobutylene amines by the reduction of nitrated polyisobutylene polymers. The polyisobutylene amines produced according to the invention are especially well-suited for use as dispersing agents in motor fuels and motor oils.

BACKGROUND INFORMATION

The production of amines via a reaction scheme including a nitration step followed by a hydrogenation step has been known in the art for quite some time. Such a reaction scheme is applicable to the preparation of polyisobutyleneamines, which are useful as dispersant additives in motor fuels and lubricants. For example, U.S. Pat. No. 5,879,420 teaches reaction products of polyisobutenes having an average degree of polymerization P of from 10 to 100 and a double bond content E in the range from 60 to 90% which can react with maleic anhydride, wherein a value of E=100% corresponds to the theoretical value for the case where each molecule of the polyisobutene has such a double bond. This patent also teaches the reaction of these materials with oxides of nitrogen or mixtures of oxides of nitrogen and oxygen and their subsequent reduction to amine products, wherein said products are suitable as additives for fuels, in particular for gasoline engines, and for lubricants. Further, U.S. Pat. No. 6,069,281 discloses the preparation of organic nitrogen compounds, in particular of aminoalkanes, alkyloximes, alkylnitrones, or mixtures thereof, which have only one nitrogen-functional group and no alcoholic hydroxyl groups in the molecule, from nitro-containing reaction products of polymers of $C_2$–$C_6$ olefins with an average degree of polymerization P=5–100 and nitrogen oxides or mixtures of nitrogen oxides and oxygen, by hydrogenation of these reaction products. The invention also relates to particular mixtures of such aminoalkanes, alkyloximes and/or alkylnitrones and to individual compounds of these types themselves. The designated products are suitable as additives for fuels and lubricants. Further, U.S. Pat. No. 5,810,894 sets forth an oligomeric olefin monoamine for use as an additive in fuels and related products, and a method of producing the same. The oligomeric olefin monoamine is free of any undesirable halogens such as would be introduced in a prior art method comprising halogenation and subsequent reaction with amine. The method of making the oligomeric olefin includes the steps of forming an oligomeric olefin epoxide, converting the epoxide to an alcohol, and then converting the alcohol through the use of ammonia to an oligomeric olefin monoamine.

Generally, the methods of the prior art which are used to produce polyisobutyleneamines, via a nitration reaction followed by a hydrogenation step, do not produce a final polyisobutyleneamine product having as high of a total amine content as is desired. This is due in large measure to the incomplete reduction of the nitrogen-oxygen species present as a raw material in the reduction step. Thus, if a method for producing polyisobutyleneamines via a reaction scheme comprising a nitration step followed by a reduction step were available in which the total amine content of the final product could be increased to more closely approach the theoretical maximum value, such method would be of great value, because the performance of the final product is directly related to the total amine content, and because the presence of unreduced nitro groups in the final product is undesirable.

SUMMARY OF THE INVENTION

The invention relates to the preparation of polyisobutylamines. We have developed a simple method for hydrogenating nitro-containing polyisobutylene. Unlike many prior art methods, in our method, neither ammonia nor amine is needed for the hydrogenation. According to the present invention, the polyisobutylamines are prepared by nitrating the corresponding polyisobutylene (PIB) followed by hydrogenation in a polar solvent.

Polyisobutylene (PIB) is known to undergo nitration by nitric acid under mild conditions. We have developed a process for hydrogenating the resulting nitro compound in the presence of a polar solvent, such as 2-ethyl-1-hexanol. We have found that in the presence of such a polar solvent, the nitro compound can be hydrogenated to give higher amine value polyisobutyamine. However, neither ammonia nor amine is needed for the hydrogenation.

In the production of an amine according to our process, a higher conversion is obtained when a hydroxyl containing solvent was used in the hydrogenation step. Normally, one would not include an alcohol in a reaction mixture undergoing reductive amination since the presence of such an alcohol would lead to products produced from the reduction of the alcohol to the corresponding amine, which would show up as an impurity. However, in a process according to the present invention, since we do not employ an amine as reactant in the reductive amination, the amination of such alcohol is not a problem.

The reactants useful in this invention are polyisobutylene and nitric acid. The nitric acid is used to nitrate the polyisobutylene. Other polyolefins may be substituted for the polyisobutylene. According to a preferred form of the invention, the catalysts used are Pd on carbon (charcoal) and nickel catalysts. The temperature range over which the nitration of the polyolefin according to the invention may be carried out is any temperature from 0 to 100° C. The temperature range over which the hydrogenation of the nitrated polyolefin may be carried out according to the invention is any temperature from 50° C. to 300° C. The pressure range over which the nitration of the polyolefin according to the invention may be carried out is any pressure from 0 to 500 psig. The pressure range over which the hydrogenation of the nitrated polyolefin may be carried out according to the invention is any pressure from 20 to 3000 psig.

Thus, the present invention provides in a two step process for producing an amine compound involving a first nitration step wherein a polyalkene is nitrated in the presence of a hydrocarbon solvent, and a second catalytic hydrogenation step in which the nitrated polyalkene from the first step, its accompanying solvent, and a catalyst are charged to a hydrogenation apparatus for purposes of reduction, wherein the improvement comprises conducting the hydrogenation step in the presence of an effective reduction-enhancing amount of a branched alcohol.

DETAILED DESCRIPTION

A process for producing polyisobutyleneamines according to the present invention comprises two steps. The first step is a nitration reaction, and the second step is a reductive hydrogenation.

For the nitration step, a polyisobutylene having a molecular weight between about 300 and 3000 (weight average MW is always used herein) is employed as a raw material. One suitable polyisobutylene is ULTRAVIS® 1000 produced by BP Amoco P.L.C. which has a molecular weight of about 1000. Since the polyisobutylene is typically a thick, viscous liquid, it is advantageous to employ a solvent, which solvent is preferably a paraffinic hydrocarbon solvent. Suitable solvents include dodecane, tetradecane, hexadecane, or mixtures thereof. One example of a suitable paraffinic hydrocarbon solvent is EXXPAR® 252 available from Exxon Chemical Company of Houston, Tex. Generally, any $C_6$–$C_{40}$ saturated hydrocarbon, linear or branched, or mixtures thereof are suitable as a solvent.

In practice, the polyisobutylene and solvent are mixed to form a homogeneous solution. Then, a nitrating agent, such as any mixture of nitric and sulfuric acids known by those in the chemical arts as being a suitable nitration acid, is added to the homogeneous solution of polyisobutylene and solvent above, with stirring and at elevated temperature, to effect nitration of the polyisobutylene with the formation of a polyisobutylene product having one or more nitro groups appended to each polyisobutylene molecule. Straight aqueous nitric acid having strength of 70% (wt.) may also be used as the nitrating agent. Nitric acid having a strength of at least 30% (wt.) is suitable for use as a nitrating agent in a process according to the invention. Once the nitrating agent is brought into contact with the polyisobutylene/solvent mixture, with sufficient stirring and under an elevated temperature, the mixture is allowed to digest at such temperature for a time period of at least two hours, under agitation and while maintaining such temperature. The useful temperature range for the nitration step is any temperature between about 20 and 100 degrees centigrade, more preferably between 30 and 80 degrees centigrade, with a temperature of about 60 degrees centigrade being most preferable. The nitro groups introduced into the polyisobutylene are available to participate in the subsequent reduction in the second, reduction step.

Prior to the reduction step, the reaction mixture from the nitration of the first step is stripped under reduced pressure to remove any excess nitric acid or other acidic nitrogen species which may be present. Then, for the reduction, an effective reduction-enhancing amount of a branched alcohol is added to the reaction mixture that comprises the nitrated polyisobutylene and paraffinic solvent. Preferably, the effective reduction-enhancing amount of branched alcohol is any amount between about 1.00% and 40% by weight based upon the total weight of the reaction mixture in the hydrogenation step.

For purposes of this specification and the appended claims, the words "branched alcohol" means any non-aromatic alcohol having between 6 and 28 carbon atoms per molecule, which is not a straight-chain alcohol, but rather includes some branching along the longest hydrocarbon chain in the alcohol. It is preferred that the branched alcohol is selected to be one which is miscible with the solvent employed. The longest hydrocarbon chain should have at least 6 carbon atoms. However, the degree of branching is at least two carbon atoms, and the branching occurs at any carbon atom other than the □-carbon to which the —OH group in the alcohol is attached. Thus, 3-methyl heptanol does not qualify as a branched alcohol within the meaning of the term as used herein, while 4-ethyl hexanol does. Other alcohols which fall within this definition, without limitation include: 2-ethyl hexanol, 3-ethyl hexanol, 4-ethyl hexanol, 5-ethyl hexanol, 2-propyl hexanol, 3-propyl hexanol, 4-propyl hexanol, 5-propyl hexanol, 2-ethyl heptanol, 3-ethyl heptanol, 4-ethyl heptanol, 5-ethyl heptanol, 6-ethyl heptanol, 2-propyl heptanol, 3-propyl heptanol, 4-propyl heptanol, 5-propyl heptanol, 6-propyl heptanol, 2-ethyl octanol, 3-ethyl octanol, 4-ethyl octanol, 5-ethyl octanol, 6-ethyl octanol, 7-ethyl octanol, 2-propyl octanol, 3-propyl octanol, 4-propyl octanol, 5-propyl octanol, 6-propyl octanol, 7-propyl octanol, 2-ethyl nonanol, 3-ethyl nonanol, 4-ethyl nonanol, 5-ethyl nonanol, 6-ethyl nonanol, 7-ethyl nonanol, 8-ethyl nonanol, 2-propyl nonanol, 3-propyl nonanol, 4-propyl nonanol, 5-propyl nonanol, 6-propyl nonanol, 7-propyl nonanol, 8-propyl nonanol, 2-butyl hexanol, 3-butyl hexanol, 4-butyl hexanol, 5-butyl hexanol, 2-butyl heptanol, 3-butyl heptanol, 4-butyl heptanol, 5-butyl heptanol, 6-butyl heptanol, 2-butyl octanol, 3-butyl octanol, 4-butyl octanol, 5-butyl octanol, 6-butyl octanol, 7-butyl octanol, 2-butyl nonanol, 3-butyl nonanol, 4-butyl nonanol, 5-butyl nonanol, 6-butyl nonanol, 7-butyl nonanol, 8-butyl nonanol, etc.

In the reduction step, a mixture comprising the nitrated polybutene compound, solvent, and branched alcohol are charged to an autoclave which is set up for reductive hydrogenation. A catalytically effective amount of a catalyst known to be useful in reducing nitro compounds to the corresponding amines is charged to the autoclave and the autoclave is sealed, pressurized with hydrogen, and heated to a desired temperature. Suitable catalysts include any of the noble metals, with nickel, palladium, and platinum, and compounds or complexes thereof, being especially preferred. Heating and hydrogen pressure are continued until hydrogen is no longer seen to be absorbed in the reaction. The useful temperature range for the reduction step is any temperature between about 50 and 300 centigrade, more preferably between 100 to 250 degrees centigrade with a temperature of about 170 degrees centigrade being most preferable. The pressure of hydrogen used during the reduction is any temperature between about 20 and 3000 psig, more preferably between 100 and 2500 psig with a pressure of about 1500 being most preferable.

The following examples are illustrative of the invention and should not be considered delimitive thereof in any way.

EXAMPLE 1

Nitration of PIB

To a 3-liter flask equipped with a thermometer, stirrer, an addition funnel, and nitrogen outlet, was charged 900 g of ULTRAVIS® 1000 (molecular weight of 970) and 600 g of EXPAR® 252. The mixture was heated to 60° C. and 150 g of 70% nitric acid was added during a one-hour period. After the addition was completed, the mixture was digested at 60° C. for six hours. The resulting mixture was then stripped of water and unreacted nitric acid under reduced pressure of 20 mm and elevated temperature of 70° C. The resulting product was analyzed by IR and NMR and showed to be nitro containing polyisobutane in paraffin.

EXAMPLE 2

Hydrogenation of Nitro Compound

To a 300-mL stirred autoclave was charged with 130 g of product from Example 1 and 8 g of 1% Pd/C catalyst. The reactor was seated and purged of air. Hydrogen was added into the reactor to about 1500 psig. The reactor was then heated to 200° C. and held for four hours. The reactor was then cooled to ambient temperature. The resulting mixture was discharged and filtered. The product was analyzed to have amine value of 0.318 meq/g.

EXAMPLE 3

The procedure of Example 2 was followed except that additional 25 g of 2-ethyl-1-hexanol was added and the reaction was run at 160° instead of 200° C. The product was analyzed to have amine value of 0.375 meq/g.

EXAMPLE 4

The procedure of Example 3 was followed except that the reaction was run at 180° C. The product was analyzed to have amine value of 0.401 meq/g.

EXAMPLE 5

The procedure of Example 2 was followed except that 10 g of nickel catalyst was used and the reaction was run at 160° C. for two hours. The product was analyzed to have amine value of 0.397 meq/g.

EXAMPLE 6

The procedure of Example 5 was followed except that additional 25 g of 2-ethyl-1-hexanol was added. The product was analyzed to have amine value of 0.509 meq/g.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

What is claimed is:

1. In a two step process for producing an amine compound involving a first nitration step wherein a polyalkene is nitrated in the presence of a hydrocarbon solvent, and a second catalytic hydrogenation step in which the nitrated polyalkene from the first step, its accompanying solvent, and a catalyst are charged to a hydrogenation apparatus for purposes of reduction, wherein the improvement comprises conducting the hydrogenation step in the presence of an effective reduction-enhancing amount of a branched alcohol.

2. A process according to claim 1 wherein said polyalkene is a polybutene having a molecular weight between 300 and 3000, including every integral molecular weight therebetween.

3. A process according to claim 1 wherein said catalyst is selected from the group consisting of: nickel, palladium, and platinum, and their compounds and complexes.

4. A process according to claim 1 wherein said branched alcohol is a primary alcohol having between 8 an 24 carbon atoms per molecule.

5. A process according to claim 1 wherein said branched alcohol has a longest chain of carbon atoms which comprises at least 6 carbon atoms, and wherein the alkyl chain branching includes at least two carbon atoms per branch, and wherein said alkyl chain branching occurs on any carbon atom other than the □-carbon to which the alcoholic —OH group is attached.

6. A process according to claim 5 in which said alcohol is selected from the group consisting of 2-ethyl hexanol; 3,3,5-trimethylhexanol; 2-butyl-1-octanol; and tridecyl alcohol.

* * * * *